Patented Nov. 10, 1931

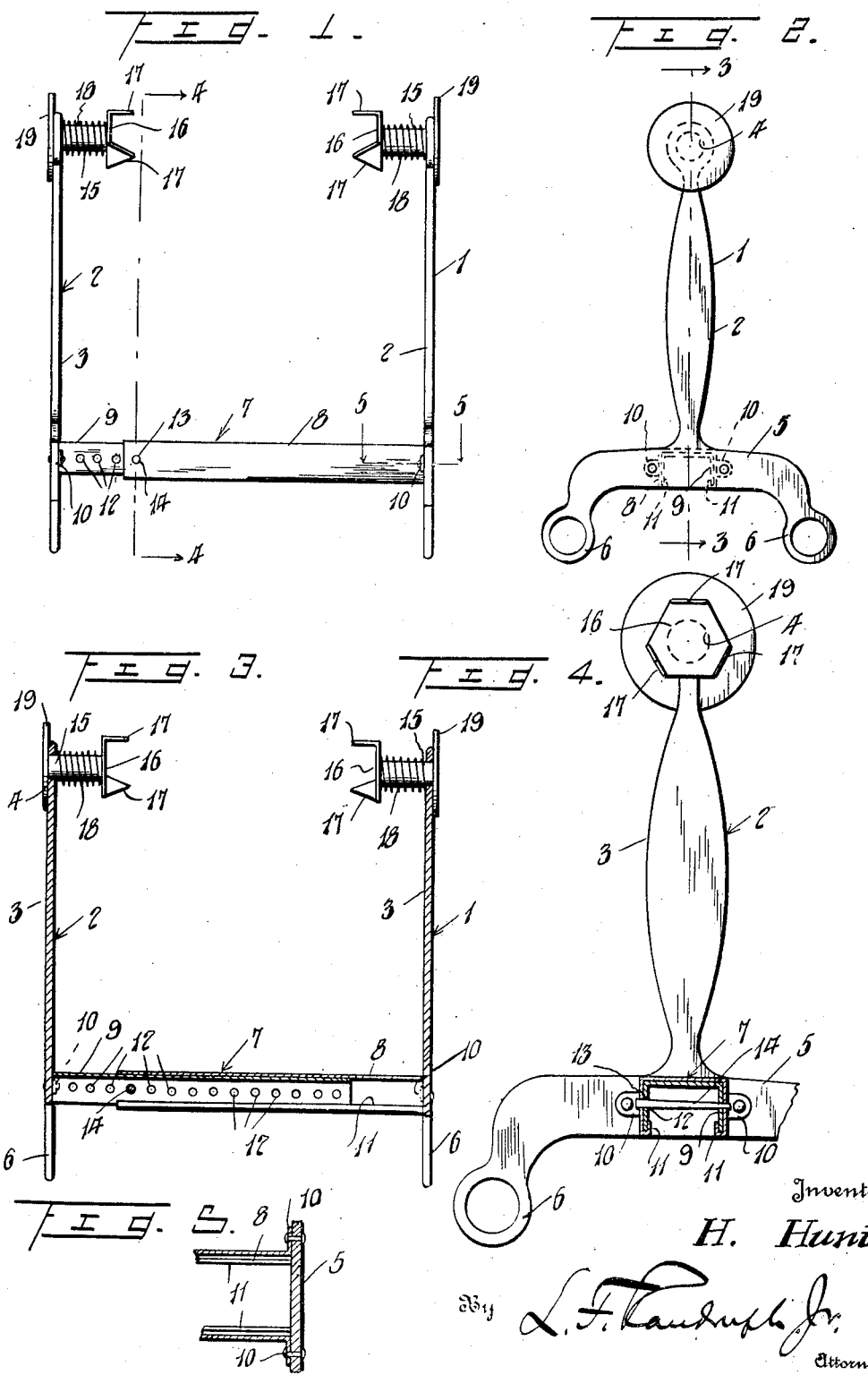

1,831,665

UNITED STATES PATENT OFFICE

HUBERT HUNT, OF SOUND BEACH, CONNECTICUT

CORN EAR HOLDER

Application filed May 29, 1930. Serial No. 457,369.

The invention relates to devices for holding ears of corn that are usually served hot at the table, and has for its object the provision of a device of the character stated that will enable serving corn on the ear in a manner pleasing to the diner, as it will eliminate holding the ear of corn by hand.

A further object of the invention is the provision of a device of the character stated provided with adjustable holding means to arrange the device for holding different lengths of corn ears, and having means by which the device with the ear in position will be supported in an upright position, enabling serving the ears of corn already mounted in the holder from the kitchen on a suitable tray or platter.

A further object of the invention is the provision of spring actuated ear engaging devices slidably and rotatably mounted on an adjustable holder, said devices being provided with pointed projections to pierce the ends of the ear and held in position by means of the spring, the holding means being rotatable to enable convenient consumption of the corn from the ear.

The invention will be described in detail hereinafter and will be found illustrated in the accompanying drawings, in which Figure 1 is a front view in elevation of the improved corn ear holder, Figure 2 is an end view, Figure 3, a longitudinal sectional view on a plane indicated by the line 3—3 of Figure 2, Figure 4 is a fragmentary transverse sectional view on a plane indicated by the line 4—4 of Figure 1, and Figure 5, a sectional detail on the plane indicated by the line 5—5 of Figure 1.

In the drawings, similar reference characters are used to designate corresponding parts in all of the views.

The corn ear holder has end members 1 and 2, each provided with upright extensions 3 having circular openings 4, forming loops, at their upper ends, and a cross bar 5 at their lower ends having downwardly projecting teeth 6 to support the device in an upright position. The end pieces 1 and 2 are adjustably connected together by means of telescoping members 7, comprising interengaging channel members 8 and 9 having laterally extending ears 10 secured to the cross bar 5 of the end members 1 and 2, respectively. The channel member 9 is slidably mounted within the channel member 8, and channel member 8 is provided with returned portions 11 on the lower edges of the channel members to slidably receive the lower edges of the channel member 9. The sides of the channel member 9 are provided with a plurality of openings 12 that are oppositely alined, and channel member 8 is provided with oppositely alined openings 13, 14 indicating a pin engaged through alined openings 12 and 13 to hold the two members in adjusted position to accommodate different lengths of corn ears.

Slidably and rotatably mounted in the openings or loops 4 are studs 15, said studs having heads 16 on their adjacent ends with pointed projections 17 thereon adapted to pierce the ends of a corn ear, and 18 indicates an expansible coil spring enclosing the studs 15 and terminally engaging the end members 1 and 2 and the head 16 to hold the pointed projections 17 in engagement with the ends of the ear. The outer ends of the studs 15 are provided with suitable handles 19 for sliding and rotating the studs in adjusting the ear of corn in position for consumption, and for rotating it to turn the ear when the device is in use.

What is claimed is:—

1. A corn ear holder, comprising end members, inverted channelled telescoping members connecting said end members, the lower edges of the outer channelled member having inwardly returned edges to support the inner channelled member, means to hold said telescoping members in adjusted positions to hold said end members relatively spaced, and spring actuated means slidably and rotatably engaging said end members and adapted to engage opposite ends of an ear of corn.

2. A corn ear holder, comprising upright end members having spaced feet, channelled telescoping members secured to said end members, one of said telescoping members having a series of openings therein, the other telescoping member having an opening to aline with the openings in the first member to receive a pin to hold said telescoping members in adjusted positions, said end members being provided with loops, studs slidably and rotatably mounted in said loops, heads on said studs having pointed projections to engage an ear of corn, and springs on said studs and terminally engaging said heads and end members to hold said pointed projections in engagement with said ear.

In testimony whereof I affix my signature.

HUBERT HUNT.